United States Patent [19]

Buser et al.

[11] Patent Number: 4,612,057

[45] Date of Patent: Sep. 16, 1986

[54] RECOVERY OF SILVER FROM PHOTOGRAPHIC FILMS BY HIGH SHEAR CONDITIONS

[75] Inventors: Kenneth R. Buser, Wilmington, Del.; Thomas A. Rettig, West Chester, Pa.

[73] Assignee: E. I. Du Pont de Nemours and Company, Wilmington, Del.

[21] Appl. No.: 693,252

[22] Filed: Jan. 22, 1985

[51] Int. Cl.$^4$ ............................................. B08B 7/04
[52] U.S. Cl. ..................... 134/13; 134/25.1; 134/29; 75/118 P; 521/46; 521/46.5; 521/48
[58] Field of Search ................ 134/25.1, 13, 29, 10; 75/118 P; 521/46, 46.5, 48

[56] References Cited

U.S. PATENT DOCUMENTS

| | | | |
|---|---|---|---|
| 3,503,904 | 3/1970 | Dietz et al. | 521/46 |
| 3,652,466 | 3/1972 | Hittel et al. | 521/48 X |
| 3,873,314 | 3/1975 | Woo et al. | 521/48 X |
| 3,928,253 | 12/1975 | Thornton et al. | 521/46 |
| 4,078,916 | 3/1978 | Gerber et al. | 521/48 X |
| 4,150,977 | 4/1979 | Phillips | 75/118 P |
| 4,324,705 | 4/1982 | Seto et al. | 521/48 X |

*Primary Examiner*—Benoit Castel
*Attorney, Agent, or Firm*—Donald W. Huntley

[57] ABSTRACT

A method for the recovery of silver from photographic film having a polyester base and a macromolecular organic polymer coating to which is adhered a light sensitive silver emulsion layer. The process includes mixing small film pieces in a hot aqueous liquid having a solids concentration level of at least 25 percent by volume. The mixture is subjected to conditions of high shear to remove the silver emulsion. The liquid containing the silver emulsion is then separated from the film pieces and the silver is recovered from the liquid.

6 Claims, No Drawings

RECOVERY OF SILVER FROM PHOTOGRAPHIC FILMS BY HIGH SHEAR CONDITIONS

BACKGROUND OF THE INVENTION

1. Field of the Invention

This invention relates to the recovery of silver from photographic films. More particularly, it relates to the recovery of silver from polyester photographic film by subjecting small pieces of the film to controlled conditions of high shear to remove the light-sensitive silver emulsion.

2. Description of the Prior Art

Polyethylene terephthalate (PET), or polyester as it is commonly known, has been widely used as a base material for photographic films. The PET film base is coated with an adhesive polymer layer of a polyvinylidene chloride (PVCD) based resin commonly referred to as saran. This polymer layer is needed to permit the adhesion of the light-sensitive emulsion layer, usually a silver halide dispersed in gelatin, to the PET base since the gelatin does not bond well to a clean polyester surface.

Each year, millions of pounds of X-ray and other photographic films are scrapped. It is obviously quite desirable to recover the valuable silver contained in this scrap film. It would also be desirable to recover the polyester base material in a pure form. Recovery of the silver and polyester in forms which are reusable reduces solid waste disposal problems and conserves our natural resources through recycling of these materials.

Prior art methods for recovering silver and/or the PET base material from photographic film have included treating the scrap material with hot caustic alkali solutions and with solvents. U.S. Pat. No. 3,652,466, which issued Mar. 28, 1972, to E. R. Hittel and assigned to the same assignee as the present application, is directed to a polyester recovery process which involves treating small pieces of scrap film with a caustic aqueous alkali solution to form a slurry. The slurry is then fed down into a classification column wherein the countercurrent flow of a slowly rising aqueous liquid tends to separate both the silver halide emulsion layer and the PVCD coating from the polyester pieces. The silver compounds are subsequently recovered from the sludge containing the emulsion and PVCD resin.

In U.S. Pat. No. 3,873,314, which issued Mar. 25, 1984, to J. T. K. Woo et al, scrap photographic film is treated by solvents such as dimethylformamide (DMF) and tetrahydrofuran (THF). The mixtures are subjected to low shearing action by stirring to dissolve the halide emulsion, and PVCD resin layer. In both U.S. Pat. Nos. 3,503,904, which issued to H. J. Dietz et al on Mar. 31, 1970, and 3,928,253, which issued to J. S. Thornton et al on Dec. 23, 1975, the film scrap is treated with an alkaline glycol such as ethylene glycol to remove the PVCD subcoating and the photographic emulsion layers. As in the case of the foregoing prior art patents, the mixtures are agitated through low shearing action.

It is also known that the silver halide emulsion can be readily stripped from PVCD coating on the polyester film simply by subjecting the film to hot water. The principal drawback to this and other prior art silver recovery techniques is that they are not efficient. A relatively significant amount of the silver is not recovered.

Also. where the emulsion and PVCD layer are removed simultaneously, subsequent separation to recover the silver is made more complicated. Moreover, merely subjecting small pieces of scrap film to a hot caustic or hot water or a solvent, and stirring the mixture in the manner described by the prior art causes the pieces to stick together when they contact one another so that a high degree of agglomeration occurs. This makes it extremely difficult to remove all the silver emulsion. It also makes it difficult to clean the individual polyester pieces sufficiently to permit recovery of commercially pure polyester.

The present invention overcomes the limitations and disadvantages of the prior art by providing a recovery process by which 99 percent or more of the silver can be recovered through the effective use of high shear conditions. Pure polyester and indeed other plastic base materials may also be recovered efficiently and economically by subsequently subjecting the scrap film to similar high shear conditions as described and claimed in allowed copending application Ser. No. 693,253, entitled "Recovery of Polyester Film Scrap by High Shear Conditions", filed the same date and by the same applicants as the present application.

SUMMARY OF THE INVENTION

A process for the recovery of silver from photographic film having a polyester base and a surface coating which provides adhesion for a silver emulsion layer which comprises:

mixing small pieces of the photographic film with a hot aqueous liquid wherein the resulting mixture has a solids concentration level of at least 25 percent by volume, subjecting the mixture to conditions of high shear until the silver emulsion layer is removed from the film pieces, and separating the aqueous liquid containing the removed silver emulsion from the film pieces and recovering the silver from the liquid.

DETAILED DESCRIPTION OF THE INVENTION

The present invention provides an efficient and economically attractive process for recovering silver from scrap photographic films by mechanical separation of the silver halide emulsion from the PVCD coated polyester film base. The photographic film is cut or chopped into small individual pieces or flakes of irregular sizes and shapes, ranging in size from about 2 to about 20 millimeters in the longest dimension. The pieces or flakes are then mixed with a hot aqueous liquid such as water heated to between about 140° F. to 200° F. at a solids level of at least 25 percent by volume. The mixture is subject to conditions of high shear until the silver halide emulsion is removed completely from the PVCD coated polyester film base. The flakes are then rinsed with additional hot water. The water containing the removed emulsion material is separated from the flakes, and the silver recovered from the rinse water.

The flakes may then be treated to recover pure polyester material by removing the PVCD coating. This is accomplished, as described in greater detail in the aforenoted copending application Ser. No. 693,253, by treating the flakes in a caustic alkali solution under conditions similar to those described in the present case: at a solids level of at least 25 percent by volume and high shear.

Recoveries of over 99 percent of the silver values have been achieved with this process. An important feature in this invention, as well as that of aforenoted copending application, Ser. No. 693,253, is the relatively high solids level of film scrap. When pieces or flakes of the scrap at solids levels of at least about 25 percent by volume are subjected to the high shearing conditions described in the following example, the high shearing forces created will effectively strip all the silver halide emulsion from the PVCD resin coating on the polyester base material.

The conditions of high shear achieved in the present invention and in that of copending application Ser. No. 693,253, provide an economically feasible process for commercial scale recovery of silver values from scrap photographic films and polyester from these films or other scrap articles with a PET base material.

The invention is further understood by the following example.

EXAMPLE

A steam-jacketed, stainless steel tank of about 50 gallons capacity containing a motor-driven, 6-bladed rotor of about 10 inches in diameter at the bottom of the tank was charged with 180 lbs of water at about 160° F. To this was added about 160 lbs of polyester film flake having the composition of about 93.5% by weight polyethylene terephthalate; about 0.1% by weight of a proprietary terpolymer of vinylidene chloride, acrylic ester monomer and itaconic acid; and about 6.4% by weight of photographic emulsion of a silver bromide/gelatin prepared as described in U.S. Pat. Nos. 2,465,319 and 2,627,088. The flakes ranged in size from about 2 to about 20 millimeters in longest dimension (the majority being about 5 to about 7 millimeters in longest dimension) and the thickness being about 0.100 millimeter. The flake concentration was about 30% by volume.

The mixture was sheared at a rotor speed of about 1300 rpm for about 30 minutes. The flakes were then rinsed in the tank with about 4000 lbs of water at about 160° F. The rinse water containing silver bromide gelatin was fed to a separate tank where 99.5% of the silver value was recovered from the rinse water. Only about 3 to 6 parts per million of the silver was left of the flakes remaining in the first tank, which were then treated according to aforenoted copending application Ser. No. 693,253, to remove the vinylidene chloride terpolymer coating to recover the pure polyester base material.

The invention is not limited to recovery of silver from polyester film but is useful for recovery of similar values from films having different plastic base materials which have been coated with a macromolecular polymer and a light sensitive emulsion. It should also be understood that while the above represents the presently preferred embodiment of the invention, variations and changes within the scope of the invention as defined by the claims may suggest themselves to those skilled in the art.

We claim:

1. A process for the recovery of silver from photographic film having a polyester base and a surface coating which provides adhesion for a silver emulsion layer which comprises:

mixing pieces of the photographic film, ranging in size from about 2 to about 20 millimeters in the longest dimension, with water heated to a temperature between about 140° F. and 200° F. wherein the resulting mixture has a solids concentration level of at least 25 percent by volume, subjecting the mixture to conditions of high shear of an intensity and for a period sufficient to leave less than about 6 parts per million of silver on the pieces, rinsing the film pieces with additional hot water after the mixture has been subjected to the conditions of high shear, and separating the aqueous liquid containing the removed silver emulsion from the film pieces and recovering the silver from the liquid.

2. A process according to claim 1 wherein the adhesive surface coating is polyvinylidene chloride.

3. A process according to claim 1 wherein the majority of the pieces range in size from about 5 to about 7 millimeters in the longest dimension.

4. A process according to claim 1 wherein the mixture is subjected to the high shear conditions by a multi-bladed rotor driven at about 1300 revolutions per minute.

5. A process according to claim 1 wherein the solids concentration level is about 30 percent by volume.

6. A process according to claim 1 further comprising:

mixing the film pieces after they are separated from the liquid containing the silver emulsion with a caustic alkali solution at a solids concentration level of at least 25 percent by volume.

subjecting the mixture to conditions of high shear until the adhesive surface coating is removed from the pieces, and separating the coating materials to recover film pieces of essentially pure polyester.

* * * * *

UNITED STATES PATENT OFFICE
CERTIFICATE OF CORRECTION

PATENT NO. : 4,612,057
DATED : September 16, 1986
INVENTOR(S) : Kenneth R. Buser & Thomas A. Rettig It is certified that error appears in the above-identified patent and that said Letters Patent are hereby corrected as shown below:

Column 4, line 39, the word "about" should read --above--.

Signed and Sealed this

Ninth Day of December, 1986

Attest:

DONALD J. QUIGG

*Attesting Officer*      *Commissioner of Patents and Trademarks*